United States Patent [19]
Dempsey

[11] 3,956,137
[45] May 11, 1976

[54] SEWAGE SEPTIC SYSTEM FOR A PLURALITY OF DRAIN FIELDS

[75] Inventor: James G. Dempsey, Woodside, Calif.

[73] Assignee: Langley Hill Quarry, Woodside, Calif.

[22] Filed: Dec. 6, 1973

[21] Appl. No.: 422,584

[52] U.S. Cl.............................. 210/532 S; 137/590; 137/608
[51] Int. Cl.²......................................... C02C 1/00
[58] Field of Search ............ 137/590, 608; 210/533, 210/534, 535, 536, 537, 91, 93, 170, 248, 253, 254, 257, 262, 532 S; 251/193

[56] References Cited
UNITED STATES PATENTS

| | | | |
|---|---|---|---|
| 382,188 | 5/1888 | Pitt | 210/536 X |
| 956,665 | 5/1910 | Ashley | 210/170 X |
| 1,099,713 | 6/1914 | Morris | 137/608 |
| 1,494,670 | 5/1924 | Delaney et al. | 210/535 |
| 2,330,447 | 9/1943 | Posey | 137/608 |
| 3,141,649 | 7/1964 | Baxter | 251/193 X |
| 3,260,371 | 7/1966 | Wall | 210/533 |

*Primary Examiner*—William R. Cline
*Attorney, Agent, or Firm*—C. Michael Zimmerman

[57] ABSTRACT

A sewage septic tank is described having a diversion system for diverting effluent from the tank from one drain field to another. A "Y" is provided on the outlet pipe of the tank to enable the effluent from such tank to be directed to either one of two drain fields. A gate valve is provided at the end of each arm of the Y to allow flow within the drain field associated therewith to be controlled. Thus, the effluent from the septic tank can be periodically diverted from one drain field to another so that such fields are allowed to alternately dry out. The position of the actuator for each of the valves provides a simple visual indication of the state of the valve at any given time.

1 Claim, 4 Drawing Figures

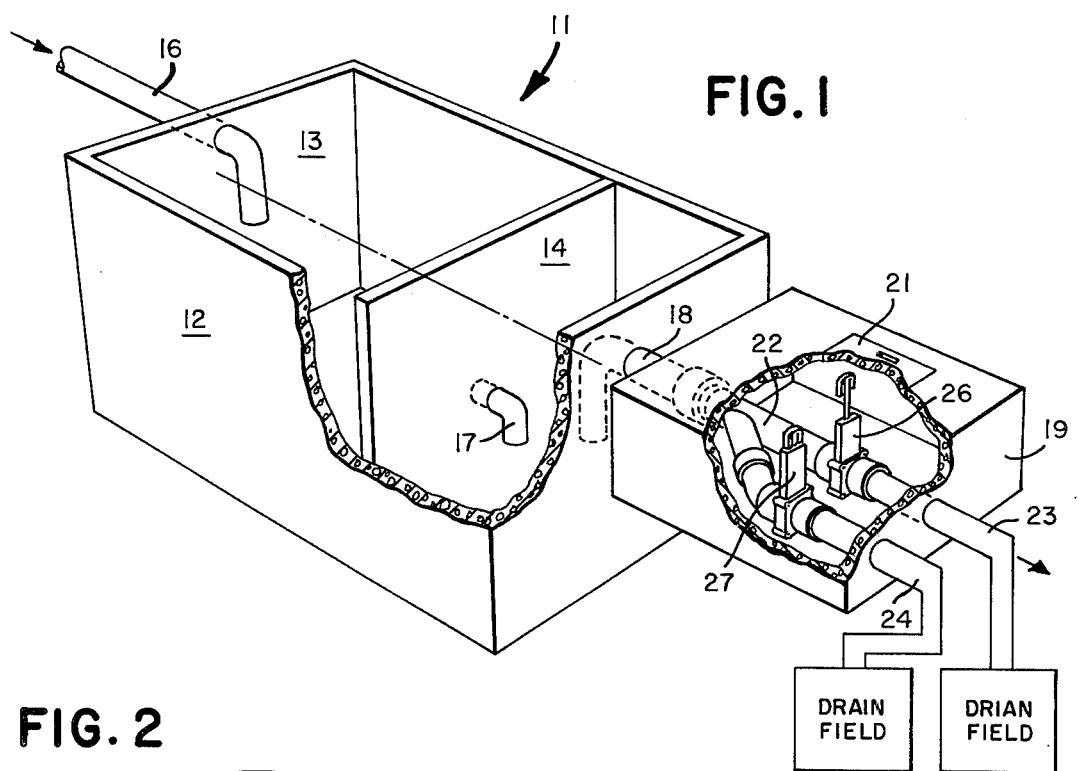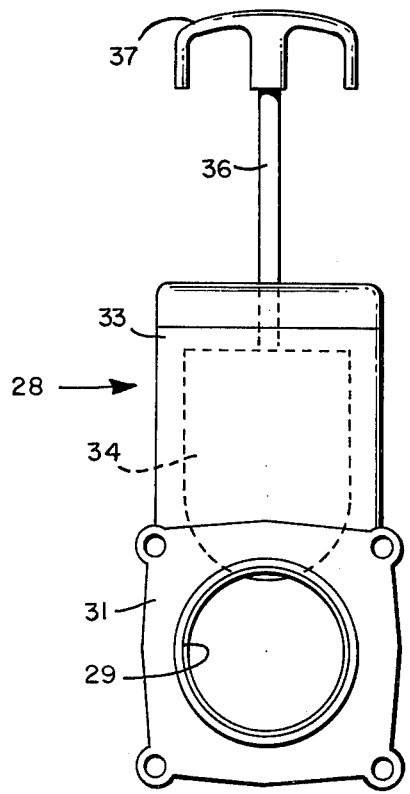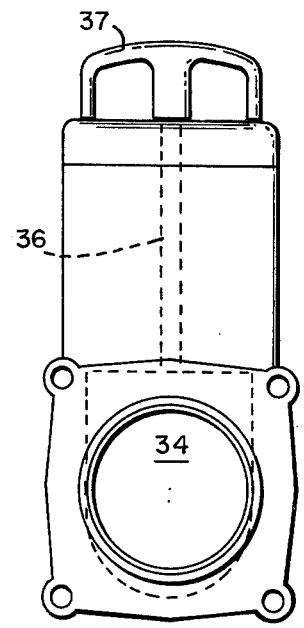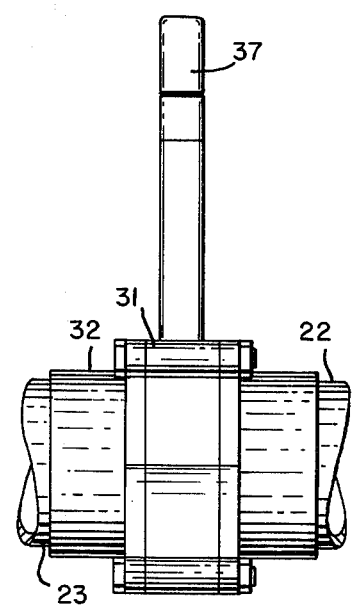

SEWAGE SEPTIC SYSTEM FOR A PLURALITY OF DRAIN FIELDS

BACKGROUND OF THE INVENTION

The present invention relates to a septic system for the decomposition of sewage and, more particularly, to such a system which is especially adapted for use with more than one drain field for ground seepage of effluent.

Septic systems are extensively used to treat sewage from individual residences and the like in areas not served by sewers. Such a system includes, in general, a septic tank into which the sewage to be treated is fed. Because of their different densities, the solid and liquid components of the sewage separate within the tank. The solid material is then decomposed within the tank by the action of anaerobic bacteria. The liquid is conveyed out of the tank and distributed through an area of subterranean soil, commonly referred to as a drain field, through which it percolates and becomes purified before again joining the underground water table.

Before a septic system can be effectively used in an area, the soil conditions must be such that adequate percolation of the liquid effluent from the tank is possible. Even when the sewage system is located in an area of optimum soil conditions, it is not unusual for the drain field soil to become saturated after a long period of use, e.g., ten years. When a drain field does become so saturated, it has been necessary to modify the septic system by providng a new drain field. It will be recognized that because of the required excavation and installation of new pipes, the provision of such a new drain field is relatively expensive. Moreover, the necessity for a new drain field is often not discovered in time to prevent unpurified liquid from joining a water table. Because of such, it is not uncommon for there to be contaminated wells and other sources of water supply in areas in which sewage is treated by spetic tanks.

It has recently been found that the life of a septic tank drain field can be considerably extended if it is periodically allowed to dry out. For this reason, it has been proposed that more than one drain field be initially provided, and that the effluent from the septic tank be periodically diverted from one of such drain fields to another so that such fields will alternately be allowed to dry out. The resulting capability of enabling drain fields periodically to dry out extends the life of a septic system considerably beyond that expected for a similar system having the same number of drain fields, to which effluent is continuously directed.

While there are diversion systems now available for selectively directing the effluent from a septic tank to a chosen one of a plurality of drain fields, they suffer from several deficiencies. For one, they generally include relatively complex and expensive valve arrangements. Moreover, some available do not provide a ready indication of which drain field or fields are in use, and which are not. Because it is only necessary to switch drain fields about once a year, it will be recognized that no provision for indicating which drain field or fields are receiving effluent and which are not, can result in confusion.

SUMMARY OF THE INVENTION

The present invention provides a sewage septic system for use with a plurality of drain fields, which system provides a simple and expensive diversion means for selectively directing the effluent from the septic tank to any chosen one or ones of a plurality of septic drain fields. As a salient feature of the instant invention, such diversion means includes a valve actuator which by reason of its position provides a visual indication of the drain field or fields to which the effluent is being directed. Thus, confusion as to which field is in use at any given time is avoided.

The diversion means of the invention simply includes a separate valve in each line extending from the septic system to each of the drain fields. Such separate valves, coupled with conventional sewage pipe, avoids the necessity of a complex manifold system or the like to enable drain field switching. The location of the actuator of each of such valves will also provide information as to the state of each valve at the time. Most desirably, each valve is simply a reciprocating gate valve having an actuating rod secured to the gate and extending to the exterior of the valve housing for movement of the gate between open and closed positions. With such an arrangement, the position of the actuating rod for each of the gates will provide a simply understood and clear indication of the state of the valve of which it is a part and, thus, whether or not effluent is being directed to the drain field controlled by such valve.

BRIEF DESCRIPTION OF THE DRAWING

With reference to the accompanying single sheet of drawing:

FIG. 1 is a broken-away, perspective view of a preferred embodiment of a sewage septic system of the invention;

FIG. 2 is a front elevation view of a valve forming part of the diversion means of the sewage septic system of FIG. 1, illustrating such valve in an open position;

FIG. 3 is another front elevation view of the valve of FIG. 2, but illustrating the same in its closed position; and FIG. 4 is a side elevation of the valve when it is in its closed position showing the same connected into the septic system of FIG. 1.

DETAILED DESCRIPTION OF THE PREFERRED EMBODIMENT

With reference to the drawing, a sewage septic system in accordance with the invention is generally referred to in FIG. 1 by the reference numeral 11. Such system includes, as is usual, a septic tank 12 divided into a settling compartment 13 and an effluent compartment 14. As is illustrated, an inlet pipe 16 is provided for conveying raw sewage from its point of origin into the settling compartment 13. Within the settling compartment, the sewage separates into its liquid and solid components, those solids which are heavier than water settling to the bottom of the tank, and those solids which are lighter than water floating to its top. Anaerobic bacteriological action then decomposes the solids, and the liquid flows into the effluent compartment 14. In this connection, it will be noted that the pipe 17 communicating the compartments 13 and 14 is substantially below the level of the inlet pipe 16 and above the floor of the septic tank. This positioning of the pipe 17 is to assure that solids adjacent the bottom or top of the septic tank are not inadvertently conveyed into the effluent compartment 14.

Further bacteriological action takes place in the effluent compartment on any particulate matter which is suspended within the liquid. Such liquid then passes through an outlet pipe 18 for distribution to a drain field diversion arrangement in accordance with the invention. Such diversion arrangement includes an underground enclosure 19 having a lid 21 facilitating access to its interior. As is illustrated, the outlet pipe 18 from the septic tank passes into the interior of the enclosure 19 where it is provided with a "Y" fitting 22. Such fitting provides communication of the outlet pipe with a pair of pipelines 23 and 24. Each of pipelines 23 and 24 passes through the wall of the enclosure and is connected with an associated drain field for the effluent.

The diversion means further include separate reciprocal gate valves 26 and 27 respectively controlling the flow of effluent to the orain field lines 23 and 24. The valves 26 and 27 are identical, and can be best understood with reference to FIGS. 2 through 4. As illustrated therein, each of such valves includes a housing 28 defining, among other things, a passage 29 for effluent. In this connection, such housing 28 is provided with a laterally projecting flange 31 for suitable connecting via bolts or the like on each of its sides to end fittings 32 on the arm ends of the "Y" 22 and the upstream ends of the lines 23 and 24.

The housing 28 further includes an extension 33 defining a pocket within which the gate 34 of such valve is retractable from the passageway 29. FIGS. 2 and 3 show the gate 34 of the valve in two different positions — in FIG. 2 such gate is shown free of passageway 29 to thereby allow unrestricted flow therethrough and FIG. 3 shows such gate blocking the passageway to prevent flow past the valve.

A valve actuator is provided for opening and closing each of the valves 26 and 27. Simply, such actuator is in the form of a rod 36 which is rigidly secured to the upper edge of the gate 34 and extends upwardly through a suitable opening in the housing extension 33 to the exterior of such housing. As illustrated, the free end of such rod outside of the valve housing terminates in a handle 37 which facilitates its manipulation.

It will be recognized that the location of the actuator rod 36 relative to the remainder of the valve will provide a visual indication of the state of such valve and, hence, whether or not effluent is being conveyed to the drain field associated therewith. More particularly, when the actuator is in its raised position illustrated in FIG. 2, it indicates that the valve is open. Because of the simplicity of the construction of the valve, most users of the system will recognize this relationship without ever having actually to be told that when the actuator is raised, the valve is open. That is, it is fairly obvious from the exterior of the valve that the extension 33 is provided for the purpose of housing the gate when it is retracted from the valve opening, and that when the actuator is in its raised position, such gate is located in the pocket of the extension, rather than in the valve opening. Thus, by comparing the state of the actuators of the valves in any diversion system of the invention, one is able to easily determine which of the drain field or fields are having effluent directed thereto at any given time. This capability is provided while at the same time a simple yet quite effective diversion system is provided for the septic tank system.

While the invention has been described in connection with a preferred embodiment thereof, it will be appreciated to those skilled in the art that various changes and modifications can be made without departing from the spirit of the invention. For example, although the diversion system is designed for use with two separate drain fields, it will be appreciated that additional drain fields can also be used merely by increasing the drain field lines and valves in order to accommodate such additional fields. Moreover, the actuating rod 36 can be made longer in order to accommodate valves which are placed more deeply beneath the surface of the ground. In view of these and other changes, it is intended that the coverage afforded applicant be limited only by the the terms of the claims and their equivalent language.

I claim:
1. A septic sewage system comprising:
   A. a septic tank which supports a bacteriological action and includes:
      1. a sewage settling compartment;
      2. an effluent compartment communicating with said sewage settling compartment;
      3. an inlet pipe communicating with said settling compartment for delivering raw sewage thereto; and
      4. an outlet pipe communicating with said effluent compartment for discharging effluent therefrom;
   B. a plurality of septic drain fields, each of which has a pipeline for conveying effluent thereto; and
   C. diversion means connected between said outlet pipe of said effluent compartment and said septic drain field pipelines for selectively directing effluent from said outlet pipe to a chosen one or ones of said plurality of septic drain fields, said diversion means including:
      1. an enclosure into the interior of which said outlet pipe passes and having a lid facilitating access to its interior; and
      2. a separate gate valve within said enclosure for each of said drain fields connecting said outlet pipe with the pipeline of its associated drain field, each of said gate valves having:
         a. a housing communicating said outlet pipe with said pipe line;
         b. a gate within said housing movable between a closed position blocking flow from said outlet pipe to the drain field pipe line with which it is associated and an open retracted position permitting effluent flow from said outlet pipe through said pipe line; and
         c. an actuator for moving said gate valve between said open and closed positions, said actuator including:
            1. a rod which is drivingly secured at one end to said gate and extends in the direction of movement between said open and closed positions to a free end exteriorly of said valve housing; and
            2. a handle secured to said free end of said rod for manually moving the same between said two positions,
         whereby reciprocation of said rod actuates said valve between said open and closed positions, and the handle and the portion of said rod exterior of said housing constitutes by reason of their relative position to other gate valves in said enclosure means providing a visual indication of the open and closed position of the valve gate to which it is secured and thereby a visual indication of the drain field or fields to which the effluent is directed by said diversion means.

* * * * *